Sept. 18, 1945.　　　J. D. BARKSDALE　　　2,384,873
LAUNDRY VEHICLE
Filed Oct. 14, 1943　　　2 Sheets-Sheet 1
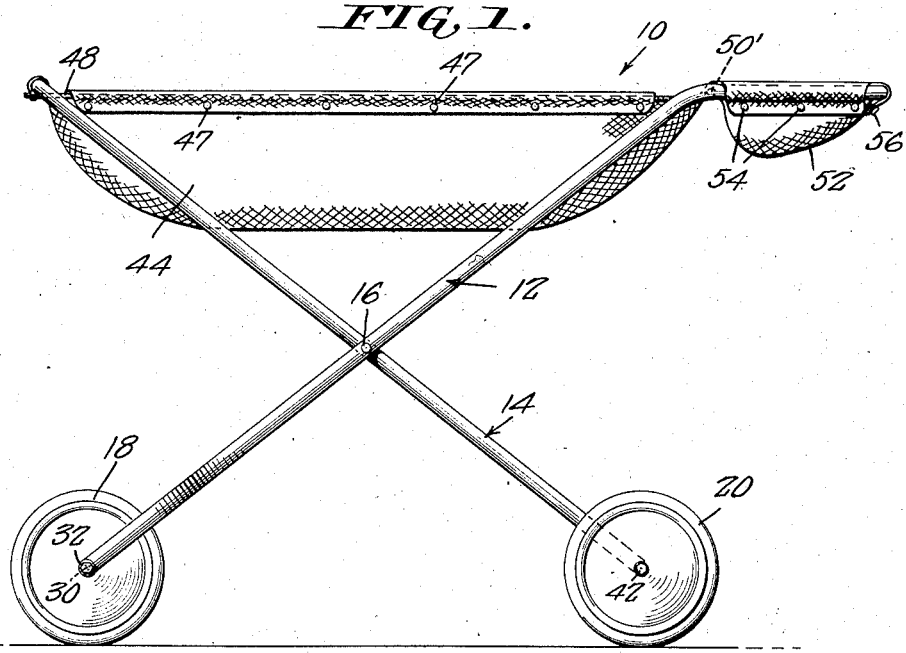
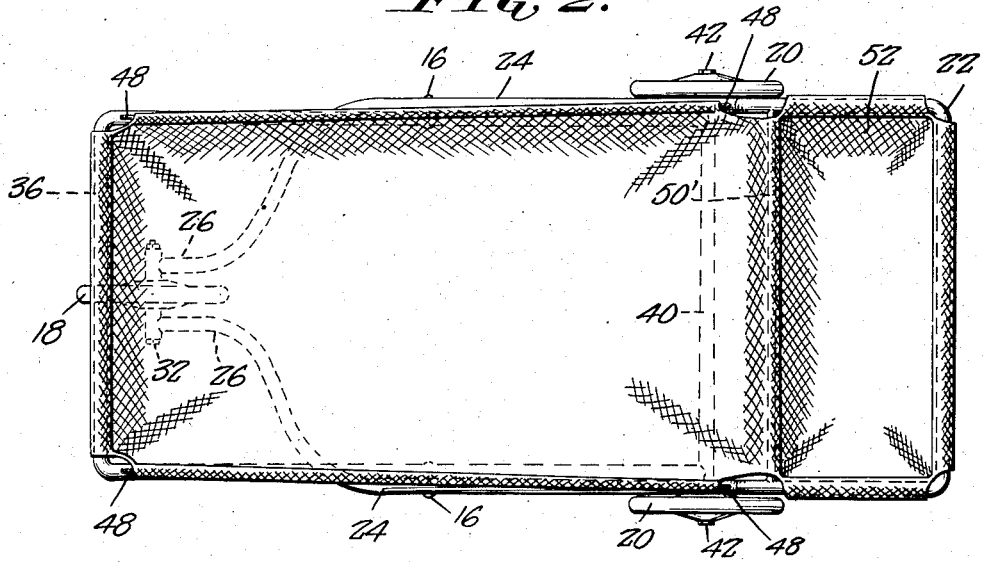
JOHN D. BARKSDALE,
INVENTOR.
BY
*Victor J. Evans & Co.*
ATTORNEYS Sept. 18, 1945.   J. D. BARKSDALE   2,384,873
LAUNDRY VEHICLE
Filed Oct. 14, 1943   2 Sheets-Sheet 2
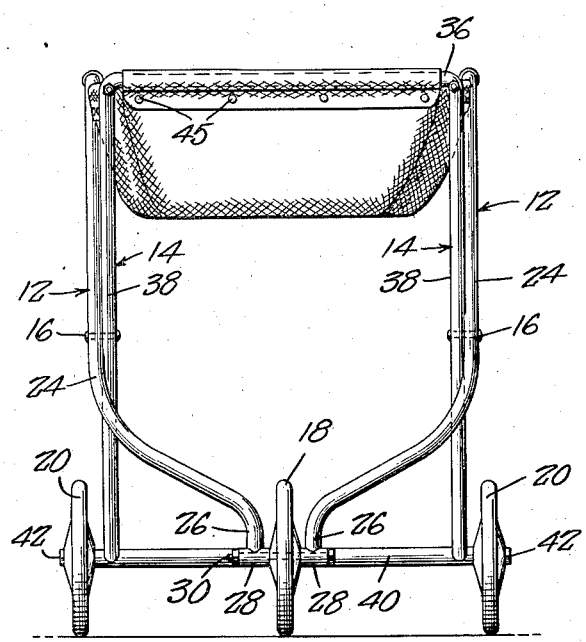
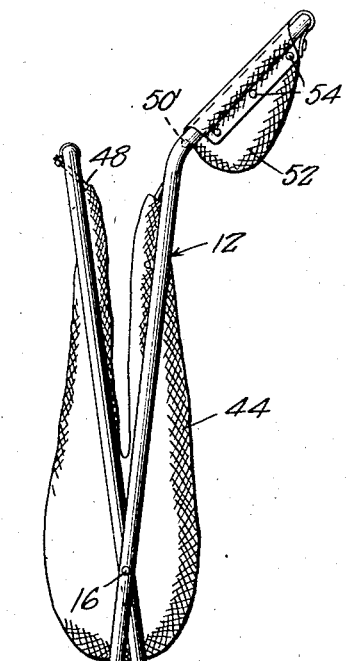
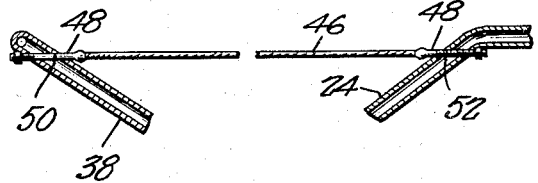
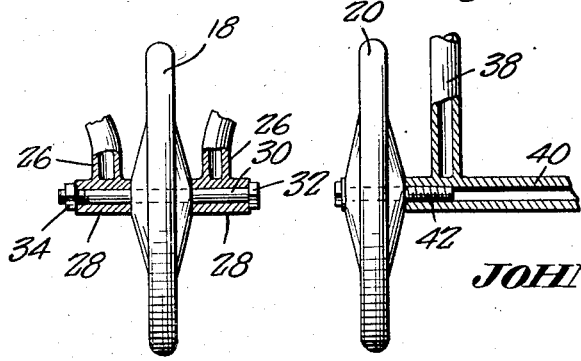
INVENTOR,
JOHN D. BARKSDALE
BY
*Victor J. Evans & Co.*
ATTORNEYS Patented Sept. 18, 1945

2,384,873

UNITED STATES PATENT OFFICE 2,384,873

LAUNDRY VEHICLE

John D. Barksdale, Oildale, Calif., assignor of one-half to James J. Shirkey, Van Nuys, Calif.

Application October 14, 1943, Serial No. 506,277

1 Claim. (Cl. 280—41)

My invention relates to clothes and clothespin receptacles, and has among its objects and advantages the provision of an improved laundry vehicle so designed as to roll easily for load carrying purposes, in which the vehicle may be positioned underneath the clothes wringer of a washing machine to receive the clothes as they emerge from the wringer, and in which the vehicle is of relatively light weight and is so designed as to be foldable into a small and compact unit when not in use.

In the accompanying drawings:

Figure 1 is a side view of the invention.

Figure 2 is a top view.

Figure 3 is a front end view.

Figure 4 is a view illustrating the vehicle in a collapsed condition.

Figure 5 is a sectional detail view of a flexible rail.

Figure 6 is a sectional view of a front wheel supporting structure, and

Figure 7 is a similar view of the supporting structure for one of the rear wheels.

In the embodiment of the invention selected for illustration, the vehicle 10 includes a first frame 12 and a second frame 14. These frames are arranged in crossed relationship and pivotally connected together at 16. A front wheel 18 is supported at the lower and forward end of the frame 12, while rear wheels 20 are supported at the lower and rearward end of the frame 14.

The frame 12 is preferably bent from a single piece of pipe to provide a handle or cross member 22 and parallel side members 24. The members 24 are bent into converging relationship at their forward ends to provide substantially parallel end portions 26 welded to right angular tubes 28 between which the front wheel 18 is positioned. The tubes 28 are coaxial for the reception of a bolt 30 extending through an opening in the wheel 18 and through both tubes. The bolt head 32 engages one tube 28 and the bolt nut 34 engages the other end to connect the parts in the manner of Figure 6, with the tubes 28 loosely abutting the side faces of the wheel 18.

The frame 14 also includes a single piece of pipe bent to provide a cross member 36 and parallel side members 38 welded at their lower ends to a cross tube or axle 40. The rear wheels 20 are arranged adjacent the ends of the axle 40 and are rotatably mounted on bolts 42 threaded into the ends of the axle, as best illustrated in Figure 7.

The members 24 lie closely to the members 38 at their crossing points, and the pivotal connection 16 comprise rivets extending through each pair of members 24 and 38.

A canvas clothes receptacle 44 is supported on flexible cables or rails 46. Two such cables are provided, each welded to bolts 48 at its ends. One bolt 48 extends through an opening 50 in one member 38 and the other bolt extends through an opening 52 in one member 24. These cables function as supports for the receptacle 44 and restrain the frames 12 and 14 from relative pivotal movement beyond the positions of Figure 1, although the frames may be pivoted together, since the cables are flexible.

One end of the receptacle 44 is folded over the member 36 and riveted at 45. The sides of the receptacle are folded over the cables 46 and riveted at 47. The material of the receptacle 44 is extended over a cross bar 50' welded to the members 24 to provide a clothespin receptacle 52. This receptacle has two ends folded about the two members 24 and is riveted at 54. The receptacle is also folded about the member 22 and riveted at 56.

The cables or rails 46 are sufficiently strong to withstand the pull exerted thereon when the frames 12 and 14 are in the positions of Figure 1 and the receptacle is loaded. The device is relatively light in weight and rolls easily, and the device may be collapsed into a small unit as shown in Figure 4. The member 22 serves as a handle and as a mount for the pin receptacle 52.

Without further elaboration, the foregoing will so fully explain my invention, that others may, by applying current knowledge, readily adapt the same for use under various conditions of service.

I claim:

A laundry vehicle comprising a frame member of generally U-shaped contour, an axle welded to the ends of the legs of said frame, supporting wheels, bolts constituting pivots for said supporting wheels and threaded into said axle, a frame member in the nature of a loop having parallel members crossing the legs of the U-shaped frame and pivotally connected therewith, said members having portions arranged in converging relationship and ends positioned closely together, tubular elements fixed to said ends, a supporting wheel located between said tubular elements, a bolt extending through the tubular elements and said last mentioned wheel to constitute a pivot therefor, a first receptacle having a portion attached to the transverse part between the legs of said first frame, a cross member attached to said loop-like frame, said receptacle having a continuation extending over said cross member and attached at three points to said second frame to provide a second receptacle, said loop-like frame having a portion constituting a handle, and flexible rails interconnecting said frame members and constituting supports for said first receptacle.

JOHN D. BARKSDALE.